United States Patent [19]
Lange et al.

[11] Patent Number: 5,630,724
[45] Date of Patent: May 20, 1997

[54] ARRANGEMENT FOR ELECTRICALLY CONNECTING A ROTATING CURRENT CONTACT TO A STATIONARY CURRENT SOURCE

[75] Inventors: Manfred Lange, Königstein; Hans-Dieter Pfeifer, Lautortal, both of Germany

[73] Assignee: Thomas & Betts Corporation, Memphis, Tenn.

[21] Appl. No.: 525,801

[22] Filed: Sep. 8, 1995

[51] Int. Cl.$^6$ .................................................. H01R 3/00
[52] U.S. Cl. .................................................. 439/164
[58] Field of Search .......................... 439/15, 164

[56] References Cited

U.S. PATENT DOCUMENTS 2,949,596  8/1960  Levene ............................ 439/164

FOREIGN PATENT DOCUMENTS 0518098  2/1940  United Kingdom ............ 439/164

*Primary Examiner*—Gary F. Paumen
*Assistant Examiner*—T. C. Patel
*Attorney, Agent, or Firm*—Michael L. Hoelter; Salvatore J. Abbruzzese

[57] ABSTRACT

An arrangement is provided for electrically connecting a rotatable current contact to a stationary voltage, such as used in the connection of an airbag in an automobile steering wheel. The arrangement comprises an insulated electric line which extends between the current contact on one side and a voltage, current or signal source on the other side and which is coiled around a rotary shaft member. The electric line is in the form of a helical spring, the spring being disposed on an inner housing portion which is positioned on the rotary shaft member and is non-rotatably connected thereto. An outer stationary housing portion encloses the inner rotatable housing portion with the helical spring being situated between the two housing portions.

12 Claims, 3 Drawing Sheets

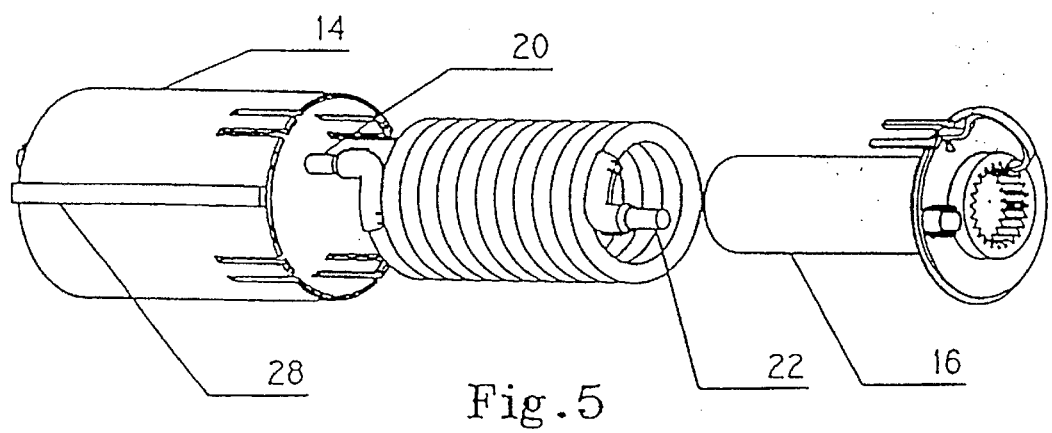
Fig. 5
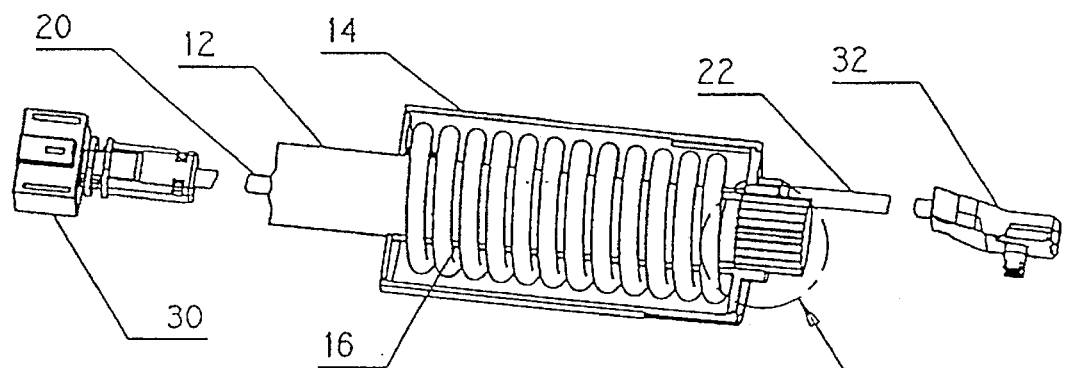
Fig. 6
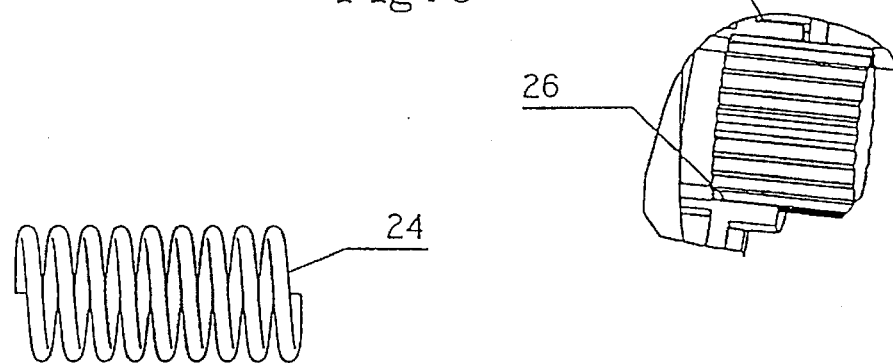
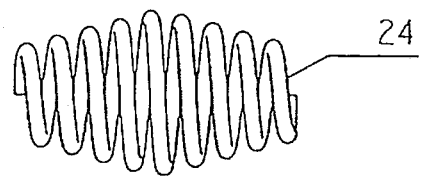
Fig. 7
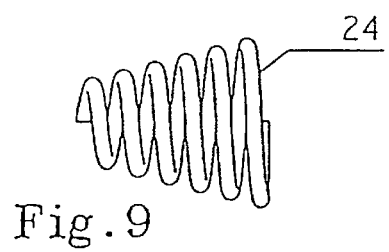
Fig. 8
Fig. 9

5,630,724

ARRANGEMENT FOR ELECTRICALLY CONNECTING A ROTATING CURRENT CONTACT TO A STATIONARY CURRENT SOURCE

FIELD OF THE INVENTION

The invention concerns an arrangement for electrically connecting a rotatable current consumer or contact to a stationary voltage, current or signal source, having an insulated electric line which extends between the current consumer or contact on the one side and the voltage, current or signal source on the other side and which is coiled around the rotary shaft member.

BACKGROUND OF THE INVENTION

A typical use for such an arrangement is the connection of an air bag which is disposed in a steering wheel, to a voltage source which is arranged stationarily in the bodywork. Horn and possibly still other contact devices for example headlamps etc. are also disposed in the steering wheel. The problem which has to be solved in terms of electrical connection of the air bag disposed in the steering wheel arises out of a rotary movement of the steering wheel. Most steering systems are so designed that the steering wheel can be turned towards the left or towards the right, from a central position. Steering lock generally involves two and a half revolutions in each direction. That means it is not possible for the air bag to be connected by way of a normally laid electric line. Even if it were laid loosely, such a line would in the long term not withstand the rotary movements of the steering wheel and the increase and reduction in length of the line resulting therefrom, and the line would suffer damage and tear. Making the connection by way of slip rings and slip ring contact has also not proved successful in the long term. After a given period of time, such connections involving the use of slip rings and slip ring contacts have frequently failed. The gas generator which is used for inflation of the air bag must be fired in fractions of a second, with a high degree of certainty. Slip rings and slip ring contacts do not afford that certainty. In order to obviate those difficulties, in the state of the art the solution now adopted has been that of connecting the air bag by way of a spiral spring. In regard to its external shape the spiral spring is comparable to the spring of the mechanism of a mechanical clock or watch. Strictly speaking, the spiral spring involves a flat-ribbon flat-conductor cable which is wound in the form of the spiral spring, comprising a plurality of mutually insulated conductors. Such flat-ribbon flat-conductor cables are commercially available in numerous different design configurations. Basically they involve two or more copper conductors of rectangular cross-section, which are enclosed between two plastic strips. They form the sheath or the insulation. In general, the plastic material used for that purpose is comparatively hard. When the steering wheel is turned in one direction or the other, the spiral spring or the flat-ribbon flat-conductor cable is wound up or unwound. When that happens its diameter decreases or increases. The spiral spring is disposed with some clearance in a housing which is mounted under the steering wheel. By virtue of that clearance and the comparatively hard plastic material for the insulation of the flat-ribbon flat-conductor cable, noises occur both upon rotary movement of the parts of the housing and also when vibration and shaking effects occur. Such noises are perceived as troublesome in the case of high-quality vehicles. Therefore sound-proofing foils have been fitted into the housings in order to suppress such noises. It should further be mentioned that a spiral spring is comparatively large in the radial direction. As a consequence the housing which accommodates the spring is also of a large diameter. Such housings can only be disposed under the steering wheel. That results in the spiral spring being positioned under the steering wheel, as already mentioned above.

SUMMARY OF THE INVENTION

In consideration of that state of the art, the object of the present invention is so to design an arrangement of the general kind set forth in the opening part of this specification that it does not suffer from the disadvantages of the spiral springs used in the state of the art, but further permits free rotatability of the steering wheel. The invention further seeks to provide in particular that the amount of space required is reduced, the generation of noise is suppressed and production and assembly costs are reduced.

In accordance with the invention, that object is attained in that the electric line is in the form of a helical spring. In the case of a helical spring compensation in respect of length also occurs in the axial direction. The differences between maximum and minimum diameter are thus smaller than in the known use of a spiral spring. Accordingly the diameter of the helical spring used in accordance with the invention, or the diameter of a housing accommodating that spring, is less than the diameter of a housing for accommodating the known spiral spring. That therefore for the first time affords the possibility of the arrangement for connection of the air bag being disposed in the steering column housing itself. In addition to the fact that the helical spring used in accordance with the invention generates less noise than the known spiral springs, the steering column housing which encloses the helical spring also has a sound-damping effect.

As stated, compensation in respect of length in the case of a helical spring also occurs in axial direction. In that direction the helical spring used in accordance with the invention takes up more space that the spiral spring used in the state of the art. More free space is available in the axial direction than in the radial direction, in a steering column housing. Accordingly, the helical spring used in accordance with the invention can be disposed in the steering column housing itself.

The invention affords a number of options in regard to the way in which the helical spring is disposed. In a first embodiment an inner housing portion is carried on the rotary shaft member and is non-rotatably connected thereto. The helical spring is in turn carried on that housing portion. The housing of the steering column housing encloses the helical spring from the outside. A particular outer housing portion which is provided only for the helical spring is not used. In a second embodiment the inner housing portion is enclosed by a particular outer stationary housing portion. The helical spring is then disposed between the two housing portions.

In a desirable development the inner rotatable housing portion is fitted onto a serration arrangement on the rotary shaft member. That therefore eliminates the screw means which are required in the state of the art, between the rotary shaft member and the rotatable housing portion. It is only necessary for grooves which are complementary to the serrations on the rotary shaft member to be provided in the inner housing portion.

The basic concept in accordance with the present invention of imparting the shape of a helical spring to the electric line can be carried into effect with practically any kind of line. The line can be for example of round, square or rectangular cross-section. It may be a one-wire or two-wire line or it may also have a larger number of wires. The use of stranded conductors is recommended in order to achieve a high level of flexibility.

Sheaths of round cross-section for single-wire or multi-wire lines naturally comprise a plastic material which is softer and more elastic than the plastic material forming the sheath of flat cables. In regard to the use according to the invention of an electric line in the form of a helical spring with one of the above-mentioned cross-sections, the generation of noise, because of the softer plastic material, is therefore substantially less than in the case of a spiral spring which is wound from a flat-ribbon flat-conductor cable, and can be practically disregarded.

The invention permits many different configurations in regard to the shape of the helical spring. The helical spring can be in the form of a cylinder. It may equally be of a diameter which decreases from the interior thereof towards both ends, over its length. This embodiment may also be considered as being of a cambered or part-spherical or bulged configuration. The helical spring may equally also be of a diameter which increases over its length from one end to the other and can thus be of a conical shape. This embodiment is particularly suitable for uses in which the line is more heavily loaded at one end.

The connection of an air bag has already been referred to as a typical use for the arrangement according to the invention. In this case the air bag forms the rotatable current consumer and is arranged in the steering wheel while the steering shaft forms the rotary shaft member of the assembly according to the invention.

In addition to the above-mentioned advantages the arrangement according to the invention also has the advantages set out below:

With the same number of revolutions, the line is shorter in the case of a helical spring than in the case of a spiral spring.

Round cables can be connected or fastened more easily than flat cables.

In addition round cables naturally have a smoother and thicker sheath than flat cables. The wires in a round cable can also be more easily shielded than the wires of a flat cable. In general the electromagnetic characteristics of a round cable are better than those of a flat cable.

The arrangement according to the invention has fewer parts, by virtue of the omission of the sound-proofing foils which are necessary when using a spiral spring. In the case of a helical spring the ends of the housing are smaller than when using a spiral spring. Just because the end surface areas of the housing are smaller as a result of that, the levels of impingement or chatter noise are lower.

BRIEF DESCRIPTION OF THE DRAWINGS

The invention will now be further described by reference to the example of the embodiments shown in the drawing, in relation to the connection of an air bag. In the drawing:

FIG. 5 is an exploded view of the inner and outer housing portions and the helical spring disposed therebetween, FIG. 6 is an overall view of a arrangement according to the invention, FIG. 7 is a diagrammatic view of helical spring of cylindrical configuration.

FIG. 8 is a diagrammatic view of a helical spring of a part-spherical or cambered configuration, FIG. 9 is a diagrammatic view of a helical spring of a conical configuration.

DETAILED DESCRIPTION OF THE PREFERRED EMBODIMENT

Figure 1:
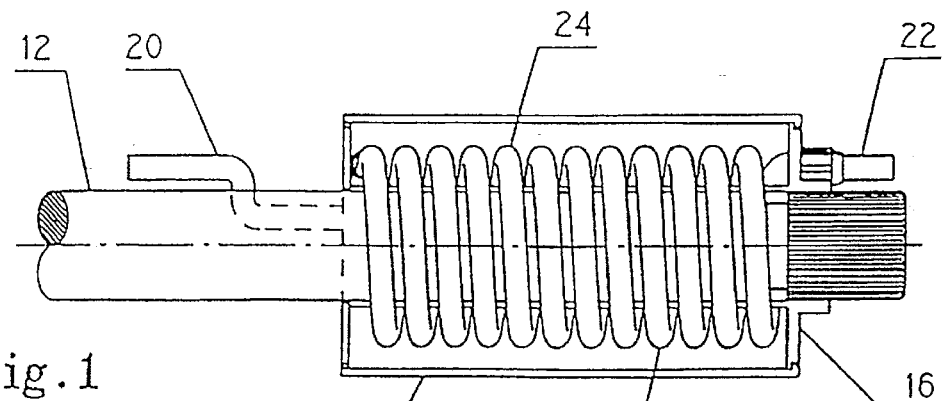
FIG. 1 is a diagrammatic view of a housing and the helical spring of a cylindrical configuration which is accommodated therein, in the central or straight-ahead position of the steering wheel.

The Figures show the steering shaft 12, the stationary outer housing portion 14 and the inner housing portion 16 which is rotatable with the steering shaft 12. The two housing portions 14 and 16 jointly enclose the line 18. The line 18 has an incoming end 20 and an outgoing end 22. The line 18 is coiled or wound in the form of a cylindrical helical spring 24 in the housing 14/16.

Figure 2:
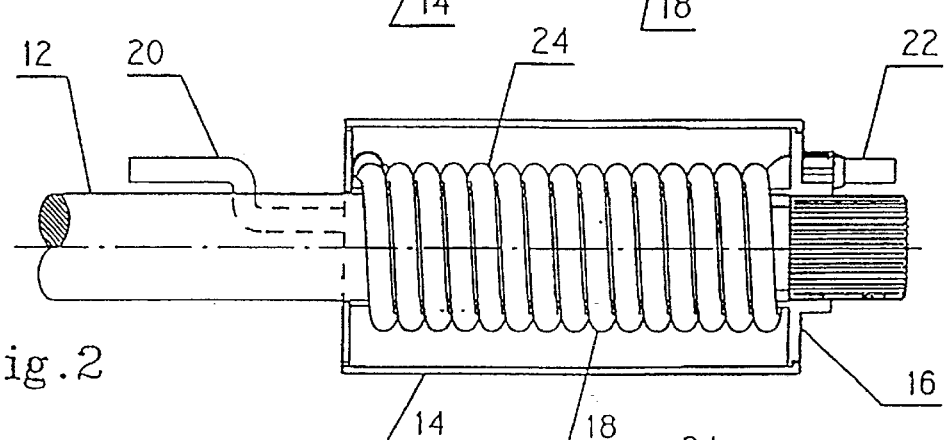
FIG. 2 is a view similar to FIG. 1 in the one limit position of the steering wheel.
Figure 3:
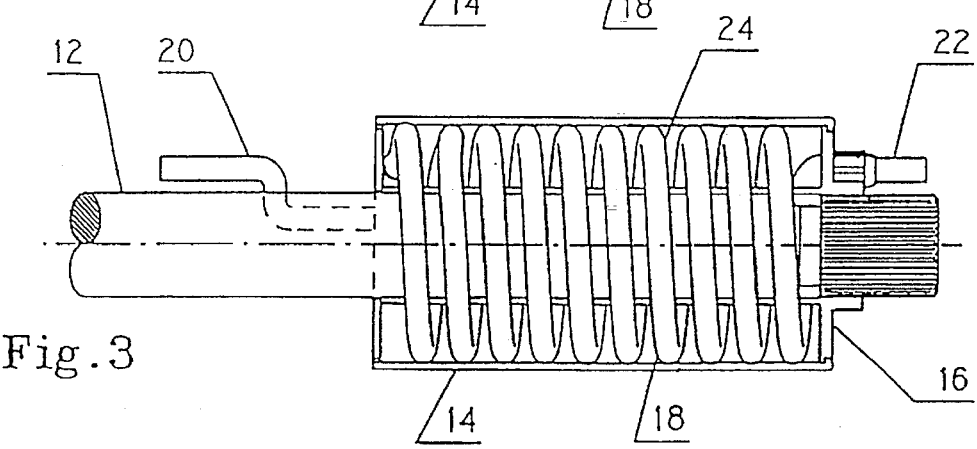
FIG. 3 is a view similar to FIG. 1 in the other limit position of the steering wheel.
Figure 4:
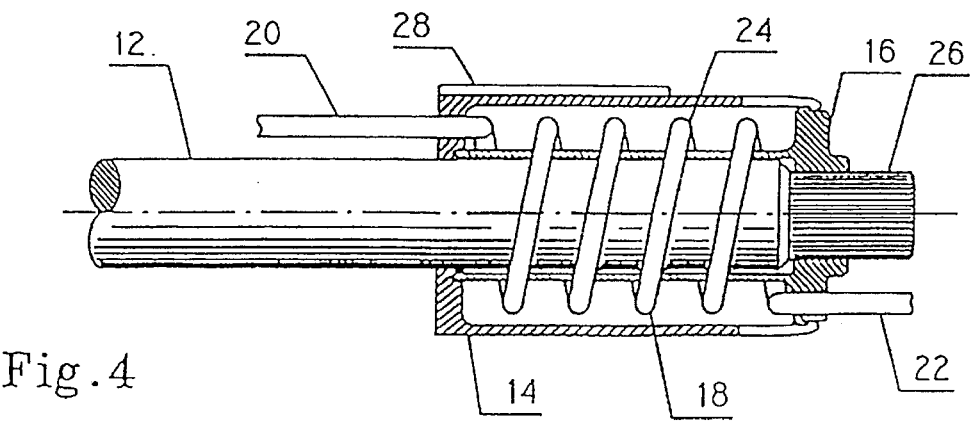
FIG. 4 is a somewhat detailed view additionally showing the arriving and departing ends of the line and the serrations on the steering shaft.

FIG. 1 shows the cylindrical helical spring 24 in the central position of the steering wheel. In that position the spring is of a medium diameter. FIGS. 2 and 3 show the cylindrical helical spring 24 when the steering wheel is in the one limit position and in the other limit position. In that respect, the spring assumes its minimum diameter in FIG. 2 and its maximum diameter in FIG. 3. Comparative consideration of those two Figures shows that compensation in respect of length also occurs in the axial direction. In FIG. 2 the individual turns of the cylindrical helical spring 24 touch while in FIG. 3 they are at a maximum spacing from each other. FIG. 4 additionally shows the serrations 26 on the steering shaft 12 and a fixing rib 28 which is fixed on the outer housing portion 14.

FIG. 5 shows the stationary outer housing portion 14 with the fixing rib 28, the inner rotatable housing portion 16 and therebetween the helical spring 24 with the two line ends 20 and 22. FIG. 5 also shows the internal serration on the inner housing portion 16. FIG. 6 shows the complete arrangement with the housing portions 14 and 16 opened. FIG. 6 also shows the connection 30 at the steering column end of the arrangement and the connection 32 at the steering wheel end of the arrangement.

Figures 10, 11:
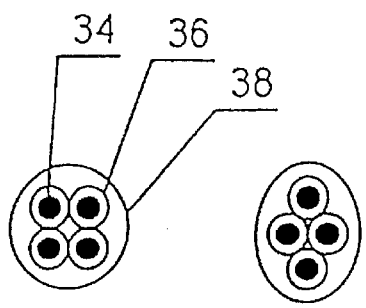
FIG. 10 is a view in section through a line of round cross-section.
FIG. 11 is a view in section through a line of oval cross-section.
Figure 12:
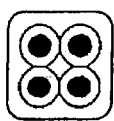
FIG. 12 is a view in section through a line of square cross-section with rounded-off corners.
Figure 13:
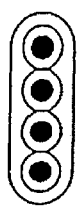
FIG. 13 is a view in section through a line of rectangular cross-section with rounded-off corners.
Figure 14:
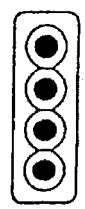
FIG. 14 is a view in section through a line of rectangular cross-section.
Figure 15:
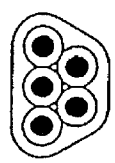
FIG. 15 is a view in section through a line of trapezoidal cross-section.
Figure 16:
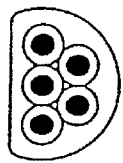
FIG. 16 is a view in section through a line of a cross-section in the form of a circle.

FIGS. 7 through 9 show examples of the configuration of the helical spring 24. FIG. 7 shows a cylindrical spring, FIG. 8 shows a part-spherical or cambered spring and FIG. 9 shows a conical spring. FIGS. 10 through 16 show various forms of the line. It more specifically comprises stranded conductors 34 which form the individual wires 36, and the sheath 38. FIG. 10 shows a line of round cross-section. The further Figures show an oval cross-section, a square cross-section with rounded-off corners, a rectangular cross-section with rounded-off corners, a rectangular cross-section, a trapezoidal cross-section and a cross-section in the form of a segment of a circle.

Having described the preferred embodiment of the invention, it should be appreciated that variations may be made thereto without departing from the contemplated scope thereof. The true scope of the invention is set forth in the claims appended hereto.

We claim:

1. An arrangement for electrically connecting a rotatable current contact to a stationary voltage, current or signal source comprising an insulated electric line which extends between the current contact on the one side and which is coiled around a longitudinal axis of a rotary shaft member, the electric line being in the form of a longitudinally elongate helical spring and having a plurality of mutually insulated wires.

2. An arrangement according to claim 1 wherein the electric line is of round cross-section.

3. An arrangement according to claim 1 wherein the electric line is of rectangular cross-section.

4. An arrangement according to claim 1 wherein the electric line is of square cross-section.

5. An arrangement according to claim 1 wherein the helical spring is in the shape of a cylinder.

6. An arrangement according to claim 1 wherein the helical spring is of a diameter which decreases over its length from the inside outwardly.

7. An arrangement according to claim 1 wherein the helical spring is of a diameter which increases over its length from one end to the other.

8. An arrangement for electrically connecting a rotatable current contact to a stationary voltage, current or signal source comprising an insulated electric line which extends between the current contact on the one side and which is coiled around a rotary shaft member, the electric line being in the form of a helical spring, wherein an inner housing portion is disposed on the rotary shaft member and is non-rotatably connected thereto and the helical spring is disposed on the inner housing portion.

9. An arrangement according to claim 8 wherein an outer stationary housing portion encloses the inner rotatable housing portion, the helical spring being disposed between the two housing portions.

10. An arrangement according to claim 8 wherein the inner rotatable housing portion is pushed onto serrations of the rotary shaft member.

11. An arrangement for electrically connecting a rotatable current contact to a stationary voltage, current or signal source comprising an insulated electric line which extends between the current contact on the one side and which is coiled around a rotary shaft member, the electric line being in the form of a helical spring, wherein the rotatable current contact is arranged on a steering wheel and the steering shaft forms the rotary shaft member.

12. An arrangement accordingly to claim 11 wherein the rotatable current contact is associated with an air bag device.

* * * * *